United States Patent
O'Shea

(10) Patent No.: US 10,200,875 B2
(45) Date of Patent: Feb. 5, 2019

(54) PLACEMENT AND SCHEDULING OF RADIO SIGNAL PROCESSING DATAFLOW OPERATIONS

(71) Applicant: DeepSig Inc., Arlington, VA (US)

(72) Inventor: Timothy James O'Shea, Arlington, VA (US)

(73) Assignee: DeepSig Inc., Arlington, VA (US)

( * ) Notice: Subject to any disclaimer, the term of this patent is extended or adjusted under 35 U.S.C. 154(b) by 0 days.

(21) Appl. No.: 15/955,433

(22) Filed: Apr. 17, 2018

(65) Prior Publication Data

US 2018/0302800 A1 Oct. 18, 2018

Related U.S. Application Data

(60) Provisional application No. 62/486,198, filed on Apr. 17, 2017.

(51) Int. Cl.
  *G06F 9/46* (2006.01)
  *H04W 16/18* (2009.01)
  (Continued)

(52) U.S. Cl.
  CPC .......... *H04W 16/18* (2013.01); *G06F 9/5066* (2013.01); *G06F 17/11* (2013.01); *H04W 16/22* (2013.01)

(58) Field of Classification Search
  None
  See application file for complete search history.

(56) References Cited

U.S. PATENT DOCUMENTS

| | | | | |
|---|---|---|---|---|
| 5,808,580 A | * | 9/1998 | Andrews, Jr. | ......... G01S 13/582 342/108 |
| 2006/0003757 A1 | | 1/2006 | Subramanian et al. | |

(Continued)

FOREIGN PATENT DOCUMENTS

| EP | 2 838 209 A1 | 2/2015 |
|---|---|---|
| WO | WO 2012/079633 A1 | 6/2012 |

OTHER PUBLICATIONS

International Search Report and Written Opinion dated Jul. 17, 2018 for PCT Application No. PCT/US2018/028030, 15 pages.

(Continued)

*Primary Examiner* — Wissam Rashid
(74) *Attorney, Agent, or Firm* — Fish & Richardson P.C.

(57) ABSTRACT

Methods, systems, and apparatus, including computer programs encoded on computer storage media, for placement and scheduling of radio signal processing dataflow operations. An example method provides a primitive radio signal processing computational dataflow graph that comprises nodes representing operations and directed edges representing data flow. The nodes and directed edges of the primitive radio signal processing computational dataflow graph are partitioned to produce a set of software kernels that, when executed on processing units of a target hardware platform, achieve a specific optimization objective. Runtime resource scheduling, including data placement for individual software kernels in the set of software kernels to efficiently execute operations on the processing units of the target hardware platform. The resources of the processing units in the target hardware platform are then allocated according to the defined runtime resource scheduling.

29 Claims, 9 Drawing Sheets

(51) Int. Cl.
  *G06F 9/50*    (2006.01)
  *G06F 17/11*   (2006.01)
  *H04W 16/22*   (2009.01)

(56) References Cited

U.S. PATENT DOCUMENTS

| | | | |
|---|---|---|---|
| 2007/0054684 A1* | 3/2007 | Ferzali | H04W 88/08 |
| | | | 455/515 |
| 2010/0325621 A1* | 12/2010 | Andrade | G06F 8/433 |
| | | | 717/156 |
| 2012/0005535 A1 | 1/2012 | Shigehara | |
| 2012/0166646 A1* | 6/2012 | Boldyrev | G06F 9/5088 |
| | | | 709/226 |
| 2013/0139148 A1 | 5/2013 | Berg et al. | |
| 2014/0129721 A1 | 5/2014 | Jackson | |
| 2015/0244624 A1 | 8/2015 | Asiano et al. | |
| 2016/0041833 A1* | 2/2016 | Standley | G06F 9/445 |
| | | | 718/100 |

OTHER PUBLICATIONS

Nicholas D. Sidiropoulos, et al., "Tensor Decomposition for Signal Processing and Machine Learning", CS Department, Carnegie Mellon University, pp. 1-44, Dec. 2016, pp. 1-44.

George F. Zaki, "Scalable Techniques for Scheduling and Mapping Dsp Applications Onto Embedded Multiprocessor Platforms", University of Maryland, pp. 1-100, 2013.

* cited by examiner

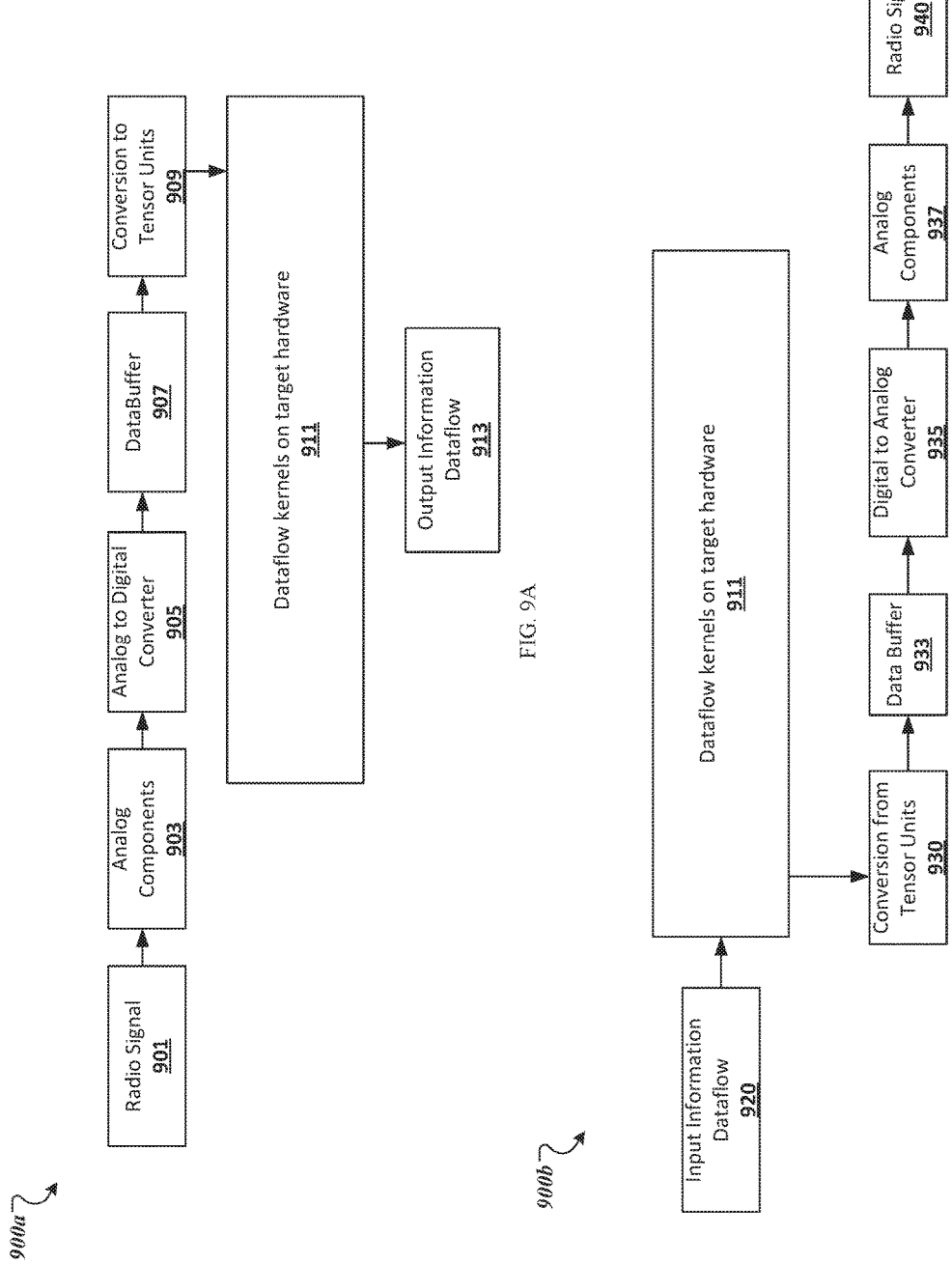

PLACEMENT AND SCHEDULING OF RADIO SIGNAL PROCESSING DATAFLOW OPERATIONS

CROSS-REFERENCE TO RELATED APPLICATION

This application claims priority to U.S. provisional application No. 62/486,198, filed on Apr. 17, 2017. The disclosure of the prior application is considered part of and is incorporated by reference in the disclosure of this application.

TECHNICAL FIELD

This specification relates to expressing, placing, and scheduling computational graph operations that represent radio signal processing algorithms for execution in a target hardware platform.

BACKGROUND

A target hardware platform can include computing devices with a single processor or multiple processors connected using network connections, memories, or buses. The target hardware platform may be a mobile phone, a software radio system embedded processor or a field-programmable gate array that processes radio frequency (RF) data, or a large-scale datacenter. Multiple processors within the target hardware platform execute software kernels that include computational graph operations.

Determining the distribution and scheduling of operations within software kernels and the distribution of the software kernels across computing devices in the target hardware platform can be challenging, e.g., given differences in computational resource usage, power usage, throughput, and energy usage needed for individual radio signal processing operations and specific target hardware platforms.

SUMMARY

This specification describes technologies for expressing and dynamically assigning and scheduling radio signal processing computational graph operations across software kernels in computing devices of a target hardware platform. These technologies generally involve methods and systems for determining optimal execution placement and scheduling for radio signal computational graph operations given a specific computational environment and optimization goals.

In general, one innovative aspect of the subject matter described in this specification can be embodied in methods that include the actions of placing and scheduling radio signal processing dataflow operations. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions The foregoing and other embodiments can each optionally include one or more of the following features, alone or in combination. In particular, one embodiment includes all the following features in combination.

An example implementation includes providing a primitive radio signal processing computational dataflow graph that comprises nodes representing operations and directed edges representing data flow, the primitive radio signal processing dataflow graph represents a functional radio signal processing application. The nodes and directed edges of the primitive radio signal processing computational dataflow graph are partitioned to produce a set of software kernels that, when executed on processing units of a target hardware platform, achieve a specific optimization objective. Runtime resource scheduling including data placement for individual software kernels in the set of software kernels are defined to efficiently execute operations on the plurality of processing units of the target hardware platform. The resources of the plurality of processing units in the target hardware platform according to the defined runtime resource scheduling.

In some implementations, prior to providing the primitive radio signal processing computational dataflow graph, functional radio signal processing tensor blocks are provided to build a functional radio signal processing application. The functional radio signal processing tensor blocks represent symbolic radio tensor expressions and directed edges that represent data flow. A functional radio signal processing block dataflow graph is obtained that includes functional tensor blocks, which represent a specific functional radio signal processing application. The functional radio signal processing block dataflow graph is mapped to a specific primitive radio signal processing computational dataflow graph that corresponds to functionality of the specific functional radio signal processing application. The specific primitive radio signal processing computational dataflow graph is then used as the primitive radio signal processing computational dataflow graph.

In some implementations, defining resource runtime scheduling further includes determining buffer sizes between software kernels, determining an amount of data on which each software kernel executes at a given time, determining an order in which the software kernels execute, and determining an amount of information transferred over a bus or memory region at each time between kernel executions or moves between processor domains.

The individual software kernels on may be executed on the processing units of the target hardware platform in accordance with the defined resource runtime scheduling.

In some implementations, operations are pipelined across the processing units of the target hardware platform. Additionally or alternatively, the operations are executed in parallel.

The functional radio signal tensor blocks may represent commonly used radio signal processing operations that act on input tensor data and produce output tensor data flow. Commonly used radio signal processing operations may include one or more of a finite impulse response filter, a fast Fourier transform, an infinite impulse response filter, a digital oscillators and mixer, an automatic gain control function, a synchronization algorithm, a symbol modulator or demodulator, an error correction encoder or decoder, GNU radio functional operations, or Matlab functional operations.

In some implementations, partitioning the nodes and directed edges of the primitive radio signal processing computational dataflow graph to produce a set of software kernels includes predicting an initial set of software kernels that minimizes an aggregate resource use of the processing units, measuring resource use of the processing unit having the initial set of software kernels, and changing the partitioning to produce an updated set of software kernels that achieves an optimization objective based on the measured resource use. Measuring resource use may include measuring actual resource use of the processing units when the processing units execute the initial set of software kernels. Measuring resource use may include measuring actual resource use while data flowing into the primitive radio signal processing computational dataflow graph changes. The data flowing into the primitive radio signal processing computational dataflow graph may include: radio frequency data, signals, signal loadings, or content types.

Achieving an optimization objective based on the measured resource use includes: identifying the optimization objective as minimizing an aggregate resource use; predicting memory access time of each processing unit; predicting communication time among the processing units; and iteratively partitioning the nodes and directed edges of the primitive radio signal processing computational dataflow graph to produce a set of software kernels that minimize the aggregate resource use based on the predicted processing capacity, predicted memory access time, and predicted communication time.

The optimization objective may be maximizing processing unit usage across all available processing units; minimizing latency of graph processing through processing units; obtaining maximum throughput; minimizing power consumption; minimizing interference with other running software processes; or minimizing processor, logic gate, or memory requirements to execute at a fixed rate or latency.

In some implementations, a second primitive radio signal processing computational dataflow graph comprising nodes representing operations and directed edges representing dependencies is obtained and the specific optimization objective is identified as minimizing an aggregate resource use of the processing units when executing both the first primitive radio signal processing computational dataflow graph and the second primitive radio signal processing computational dataflow graph.

The processing units of the target hardware platform may include processing units of multiple types.

Defining data placement for the individual software kernels to efficiently distribute operations across the processing units of the target hardware platform may include: determining an optimal processing unit type on which to execute at least one software kernel from the multiple types of processing units in the target hardware platform; and defining a data placement of the at least one software kernel in the set of software kernels to a processing unit in the target hardware platform of the determined optimal processing unit type.

The functional radio signal processing application may include: implementing a communications modem; performing a cellular baseband processing task; performing radio sensing, labeling, analysis, or mapping; processing a radio signal to remove interference or correct for distortion; or sending or receiving radar pulses. Performing a cellular baseband processing task may include transceiving (e.g., transmitting or receiving) an LTE, a 5G, or a 6G waveform. Performing radio sensing may include sensing for radio signals for identifying threats, anomalies, hardware failures, interferences, or mappings. The functional radio signal processing application may include processing a radio frequency signal to generate a radio frequency signal with interference or distortion removed. The functional radio signal processing application may include processing radar signals to generate pulses as tensors and to receive pulse responses and estimate properties of reflecting items.

In some implementations, the target hardware platform includes a large-scale datacenter with modems receiving data from input streams from antennas and analog to digital converters and computing devices. The target hardware platform may include at least one of: a single processor, multiple processors of a same type, a shared memory architecture with multiple types of co-processors, a distributed memory architecture, or a network of multi-processors or multi-multi-processors that each has separate memory architectures.

The tensor data may include radio signals such as digitally sampled In-Phase and Quadrature time series numbers, digitally sampled acoustic time series information, power frequency spectrum information such as spectrograms, radar data-cube processing information such as pulse integration, output of other software that might produce vectors of bits, packets, messages, samples, or values.

In some implementations, obtaining a functional radio signal processing block dataflow graph comprising functional tensor blocks that represent a specific functional radio signal processing application may include providing a user interface that allows a user to select functional signal processing blocks and connect the functional signal processing blocks together to form a functional radio signal processing application; and receiving the functional radio signal processing application in the form of a functional radio signal processing block dataflow graph from the user interface.

In some implementations, partitioning may include iteratively partitioning.

In some implementations, the functional radio signal tensor blocks may represent a combination of one or more radio signal processing operations and machine learning operations that act on input tensor data and produce output tensor data flow.

In another implementation, a functional radio signal processing application may be identified to perform in a deployed radio system. A primitive radio signal processing computational dataflow graph that comprises nodes representing operations and directed edges representing data flow may be obtained. This graph may represent a functional radio signal processing application and achieve a specific optimization objective during execution on a hardware platform in the deployed radio system. The primitive radio signal processing computational dataflow graph may be executed on the hardware platform in the deployed radio system.

Another implementation may be a system comprising one or more computers and one or more storage devices storing instructions that are operable, when executed on one or more computers, to cause the one more computers to perform any of the above implementations.

Still another implementation may be one or more non-transitory computer-readable storage mediums comprising instructions stored thereon that are executable by a processing device and upon such execution cause the processing device to perform any of the above implementations.

The subject matter described in this specification can be implemented in particular embodiments so as to realize one or more of the following advantages.

An operation placement and scheduling technique as described in this document can dynamically assign and schedule radio signal processing operations for execution on target hardware platforms that have multiple different configurations to provide optimal executions to achieve various optimization objectives. Such optimization objectives include, for example, minimizing resource usage, maximizing throughput, minimizing latency, maximizing processing elements for computations, and minimizing power consumption.

Often, conventional techniques do not make a distinction between high-level functional capabilities and low-level computational graph operations, leading to sub-optimal mappings to software kernels. In GNU radio, for example, functional capabilities correspond directly to rigid pre-defined software kernels.

While conventional techniques are limited in the way that radio signal processing algorithms are expressed and the methods by which the algorithms are processed for placement onto a specific architecture, the operation placement and scheduling methods and systems described herein are able to flatten radio signal processing block graphs into fine-grained radio signal processing operation graphs by joining operations across functional capabilities to efficiently map and schedule operations across multiple different hardware platform architecture configurations. The joined operations can then be placed and scheduled in a target hardware platform, e.g., within low power, small, mobile radio devices or in large scale enterprise signal processing environments, to optimize radio signal processing execution. The disclosed methods and/or systems improve upon the state of the art by leading to highly efficient algorithm synthesis on homogenous (e.g., multiple cores of the same type of processor), or heterogeneous (e.g., a collection of different types of processors and co-processors connected by some memory and/or bus) many core and distributed memory architecture processors, or both. The disclosed techniques, which result in efficient expression and synthesis, scheduling, and execution of radio signal processing algorithms have major applications in low power, small, mobile radio devices, and in large scale enterprise signal processing environments with many processors and many waveforms, among others.

By dynamically estimating optimal placement and scheduling of radio signal processing operations, the disclosed systems and methods ensure more efficient use of resources, e.g., computational capacities of various processing units, sizes of buffers, memory and cache architecture, throughput among processor domains, and placement and scheduling of operations in a target hardware platform that will achieve defined optimization goals compared to conventional radio signal processing operation placement and scheduling techniques. The target hardware platform can, for example, obtain a higher aggregate throughput or lower latency for an application with operations that have been optimized using a disclosed technique due to mitigation of bottlenecks that limit the application's ability to scale. By using a disclosed technique, a target hardware platform may also be able to reduce resource consumption, such as by lowering the minimum required element clock speed or reducing the amount of buffering needed for a given fixed rate signal processing application based on the optimal runtime scheduling of operations. This ability provides major power savings advantages over conventional systems.

The disclosed operation placement and scheduling methods and systems can learn, by training, a mapping from hardware platform capabilities to optimization goals to optimal placement and scheduling. For example, the techniques can map operations to physical devices to minimize an aggregate cost of processing element capacity, memory access, and communication latency.

The disclosed operation placement and scheduling methods and systems can also mix traditional radio signal processing expressed as computational graphs with machine learning models that are also expressed as computational graphs to determine efficient placement and scheduling of applications that include both types of processing.

Additionally, by allowing an efficient and automated mapping from functional definition to hardware target devices through this mapping, the disclosed operation placement and scheduling methods and systems ensure that applications and waveforms will be significantly more portable between target hardware platform architectures.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 8B illustrates the operations executed in parallel, in some implementations the operations are pipelined across the processors in the target hardware platform.

FIG. 9A illustrates an example radio receiver system in which resources and kernel placements are defined by runtime resource scheduling in order to efficiently execute operations on the target platform to achieve optimized execution.

FIG. 9B illustrates an example radio transmitter system in which resources and kernel placements are defined by runtime resource scheduling in order to efficiently execute operations on the target platform to achieve optimized execution.

Like reference numbers and designations in the various drawings indicate like elements.

DETAILED DESCRIPTION

This specification generally describes operation placement and scheduling systems and methods that expresses functional radio signal applications as primitive radio signal processing computational dataflow graph operations and determines optimal execution placement and scheduling of the operations and other resources in a target hardware platform.

The operation placement and scheduling systems and methods can be used to design and deploy radio signal processing systems that perform specific applications. One example radio signal processing application may sense radio signals to identifying threats, anomalies, hardware failures, and/or interferences. Another example radio signal processing application may synthesize radio communications modems for space communications systems, cellular communications systems, backhaul communications systems, or military mesh networking communications systems. An additional example radio signal processing application may process a radio frequency (RF) signal to generate RF signal with interference or distortion removed. A radio signal processing application may perform a cellular baseband processing task to transceiver (e.g., transmit or receive) an LTE, a 5G, or a 6G waveform. A radio signal processing application may also perform processing on signals from one or more antennas at a base station or cell tower to modulate, transmit, receive, combine, or recover bursts to or from multiple users, such as in a cellular massive MIMO baseband processor.

The operation placement and scheduling systems and methods can be used to create a radio signal processing system for processing radar signals in order to generate pulses, receive pulse responses, and estimate properties of reflecting items. Further, the operation placement and scheduling systems and methods can be used to design and deploy systems in large-scale datacenter processing. For example, a radio processing system may be installed in a datacenter that includes a satellite internet operator operating 100 modems with a variety of modulations and encodings affecting modem complexity that each transmit or receive 20 MHz of bandwidth across 50×40 MHz input streams from antennas and analog to digital converters. The 100 modems may be run across a network environment of 20 multi-core computers with GPUs. The operation placement and scheduling system can estimate the optimal placement and scheduling of an application on the modems across the computers.

In addition to larger-scale data center platforms, radio signal processing functionality can be deployed on one or more radio receivers, one or more radar processors, one or more radio transmitters, or another hardware platform or combination of hardware platforms.

Figure 1:
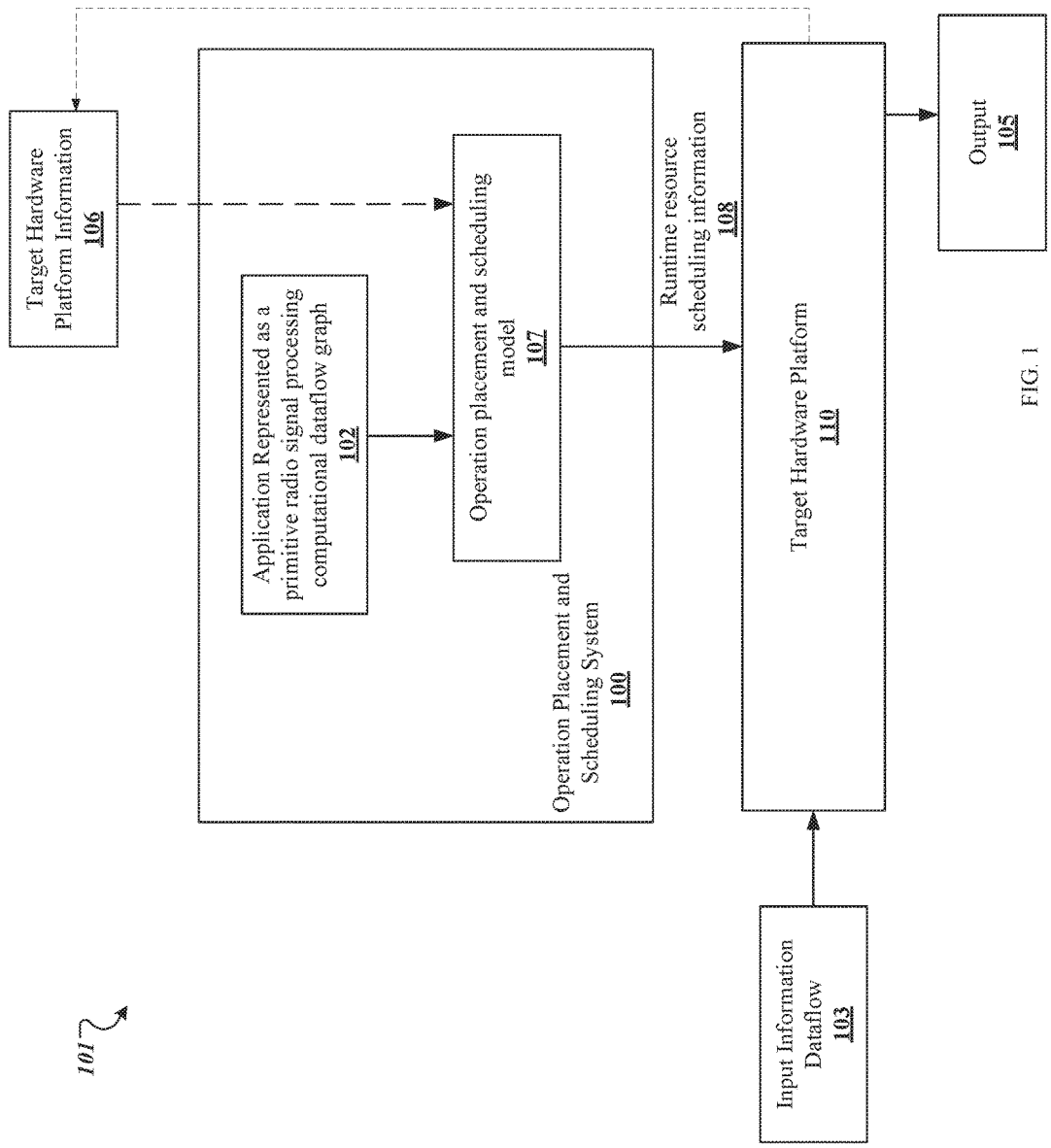
FIG. 1 is an overall system diagram that shows an example operation placement and scheduling system for optimally assigning and scheduling radio signal operations on processing units of a target hardware platform.

FIG. 1 illustrates an example operation placement and scheduling system 100. The operation placement and scheduling system 100 is an example of a system implemented as computer programs on one or more computers in one or more locations, in which the systems, components, and techniques described below can be implemented. The operation placement and scheduling system 100 determines optimal placement and scheduling of computational graph operations and resources for an application represented as primitive radio signal processing computational dataflow graph 102 within a target hardware platform 110. An operation placement and scheduling model 107 takes as input the application represented as primitive radio signal processing computational dataflow graph 102 and information about a target hardware platform 106 to which the application is going to be scheduled and deployed.

A primitive radio signal processing computational dataflow graph 102 includes nodes connected by directed edges. Each node in the computational graph represents an operation. An incoming edge to a node represents data flow of an input into the node, i.e., an input to the operation represented by the node. An outgoing edge from a node represents a flow of an output of the operation represented by the node to be used as an input to an operation represented by another node. Thus, a directed edge connecting a first node in the graph to a second node in the graph indicates that an output generated by the operation represented by the first node is used as an input to the operation represented by the second node. Data flowing into the primitive radio signal processing computational dataflow graph may include: radio frequency environment data, signals, signal loadings, data packets, or other content types.

The target hardware platform 110 may include a single processor; multiple processors of the same type; a shared memory architecture with multiple types of co-processors, e.g., multiple processors of multiple types such as a graphics co-processor card; a neuromorphic processor, a programmable logic device such as a field-programmable gate array; a distributed memory architecture such as processors that have separate memory regions for each processor; or a network of multiple processors or multiple types of processors that each have a multi-core and a partitioned, or separated, memory architecture. The target hardware platform may be a cellular phone, a hand held phone, multiple cores on an embedded DSP or embedded processor, or a large number of distinct multi-processor computers with graphics or other tensor co-processors within a large network configuration.

Information about the target hardware platform 106 may include data identifying the available processing units in the target hardware platform, the processing capabilities of the processing units, the available memory in the target hardware platform; data about a bus or network connecting processors in the target hardware platform, e.g., one or more of the bandwidth, a latency of communication, or speed, available energy or battery life of computing devices in the target hardware platform, and other information about the target hardware platform 106 (e.g., hardware specifications of one or more processors or digital logic devices, available instructions and capabilities, compilation toolchains, other software running thereon, bus and interconnect information, memory capacities, rate of input information, information about the input and output information streams, among others).

In some implementations, the system can additionally, optionally, receive, e.g., from a user, an optimization input that identifies one or more optimization objectives that should be emphasized during the processing of the graph. The optimization input may be communicated by a user, designer, or automater controller through the specification of weights on one or more optimization objective functions. These weights, for example, may estimate or measure a performance metric such as throughput, power consumption, or latency, or otherwise be based on a plurality of placement and scheduling candidates. The system may choose the configuration that best achieves the selected objectives in proportion to their weights.

For example, the optimization objective may be to minimize an aggregate resource use. This goal may be achieved by minimizing the aggregate resource use of a target hardware platform when partitioning a primitive radio signal processing computational dataflow graph into a set of software kernels. The system 100 can use known or predicted resource usage and capabilities of the target hardware platform in the determination of how to partition. The system 100 may determine the processing capabilities and capacity of each processing unit of a target hardware platform, the known or predicted memory access time to run the computational graph, the known or predicted communication time required to communicate information among processing units, overhead time spent on context switching by processors, and other system behaviors and constraints that impact the performance of a scheduled application.

Other optimization objectives may be: to maximize effective processing unit usage across all available processing units; to minimize latency of graph processing through processing units; obtaining maximum throughput; minimizing power consumption of the target hardware platform computing devices while executing the computational graph; minimizing interference of the computational graph while other software processes that are running on the target hardware platform; and minimizing resources consumption of processor, logic gate, or memory requirements to execute a graph at a fixed rate, with hard constraints of data throughput rate (e.g. 18.72 mega-samples per second (MSamples/sec)), or at a specific minimum latency (e.g. 10 ms deadline). This can be achieved, for example by explicitly discounting the plurality of scheduling and placement candidates which do not achieve the required throughput or latency, and then choosing one or more candidates with best resource usage metrics as specified by weightings on these objectives.

The operation placement and scheduling model 107 uses the input of the computational graph 102, the target hardware platform information 106, and optionally the optimization input to partition the nodes and directed edges of the primitive radio signal processing computational dataflow graph 102 to produce a set of software kernels that achieve the optimization objective or objectives specified by the optimization input when executed on the target hardware platform. In addition to producing software kernels, the model 107 determines runtime resource scheduling for the software kernels as well as other resources in the target hardware platform 110. This process is described in more detail below with respect to FIG. 6.

The system then provides runtime resource scheduling information 108 to the target hardware platform 110 for optimal execution of the specific radio signal processing application 102 on the target hardware platform 110. The runtime resource scheduling information 108 may be an efficient mapping/realization, which may include processor assignments of kernels, buffer sizes, locations and references between kernels, memory transfer instructions between separated memory domains, orders and/or size of work (e.g. number of items processed) for software kernels, etc. The runtime resource scheduling information may be provided in the form of a compiled program, an intermediate language representation such as an abstract syntax tree, as well as metadata files or data structures describing the system, its placement and execution. The target hardware platform 110 can then take in input information dataflow 103 in the form of tensors and execute the computational graph 107 on the input 103 to produce output 105. A tensor refers to a collection of numbers arranged densely in N dimensions, such as a vector (rank N−1 tensor), a matrix (rank N−2 tensor), or a higher dimension tensor. This input tensor data may include radio signals such as digitally sampled In-Phase and Quadrature time series numbers, digitally sampled acoustic time series information, power frequency information such as spectrograms, radar data-cube processing information such as pulse integration, or output of other software processes that may produce vectors of bits, packets, messages, samples or values. The output 105 is the result of running the specific application graph on the input data 103 in the target hardware system.

Figure 2:
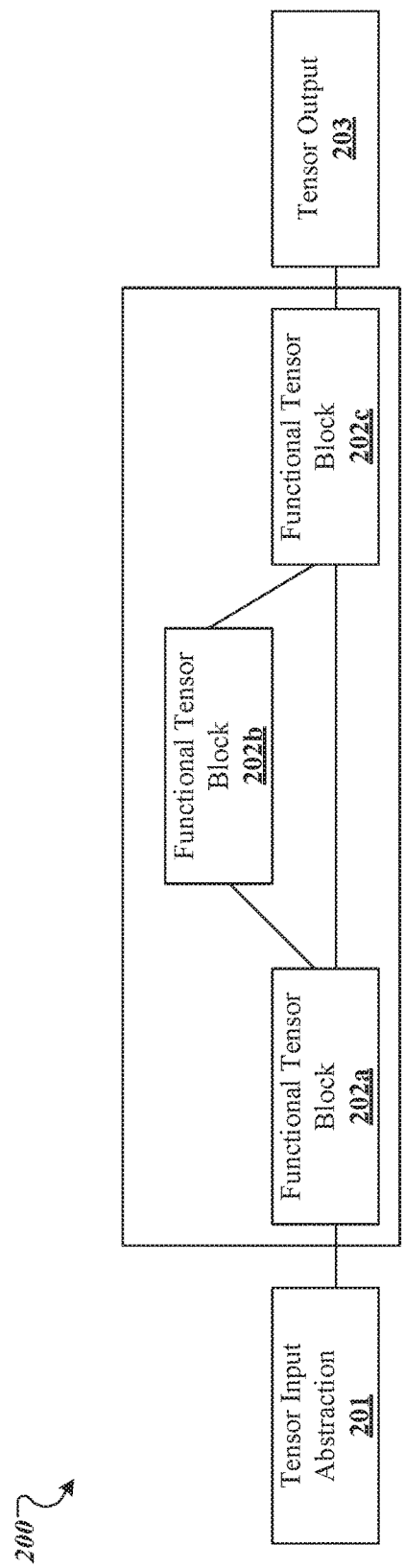
FIG. 2 illustrates an example functional radio signal processing block dataflow graph.

The operation placement and scheduling system 100 represents a radio signal processing application using functional tensor blocks (202a-202c) as illustrated in FIG. 2. Each functional tensor block (202a-c) represents a commonly-used signal processing operation that acts on input tensor data (201) and produces tensor output (203). The chosen functional tensor blocks (202a-c) together build the radio signal processing application. Commonly-used signal processing operations can include a finite impulse response filter, a fast Fourier transform, an infinite impulse response filter, an automatic gain control, a synchronization or demodulation algorithm, an error correction decoding algorithm, a beam steering or multi-antenna combining algorithm, or another high level signal processing operation. One example of a similar set of high level functional signal processing blocks is the collection of blocks for a GNU radio application. The high level functional signal processing blocks may also represent Matlab functionality.

Figure 3:
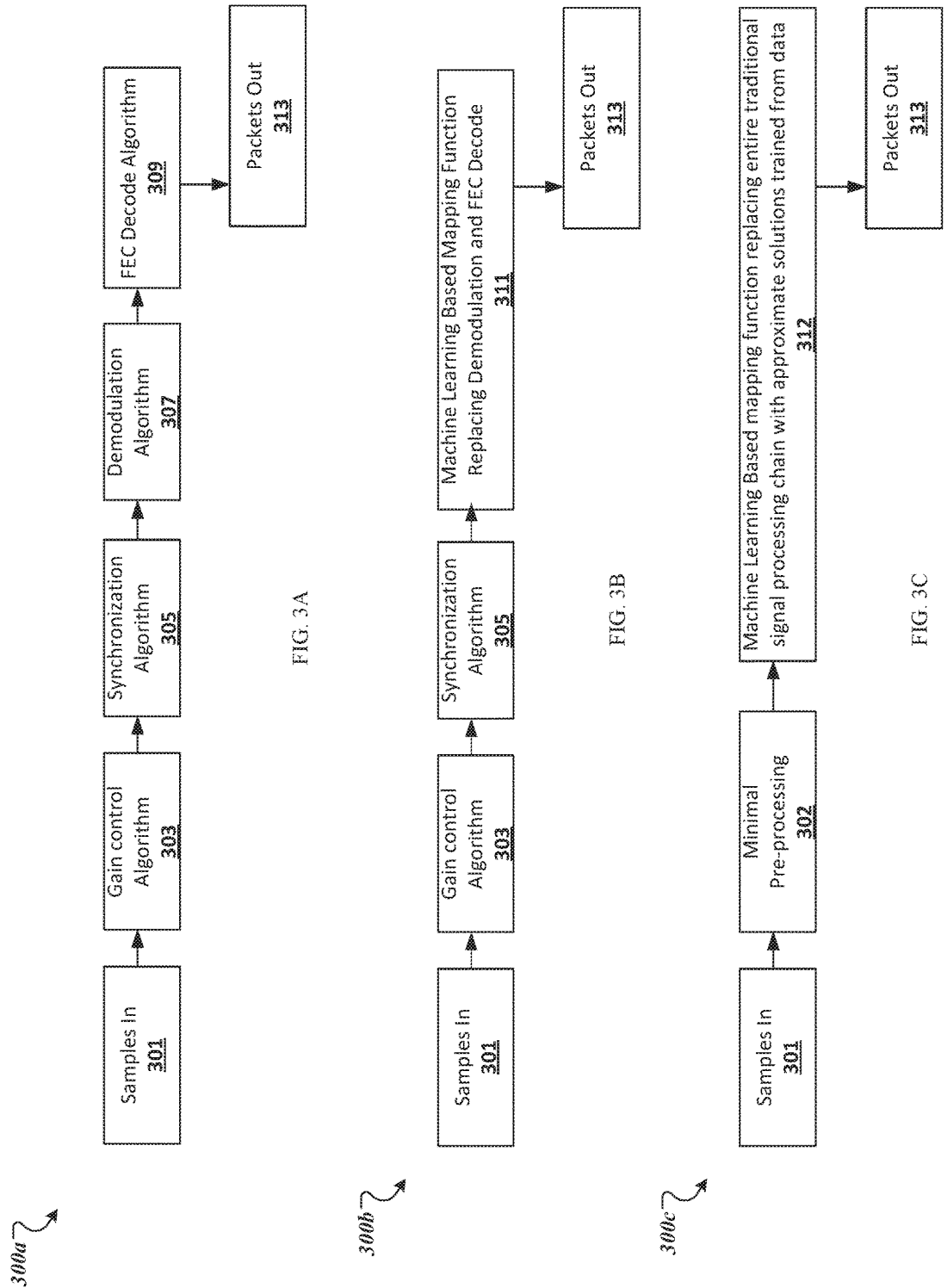
FIG. 3A illustrates an example radio signal processing application that is completely defined as digital signal processing tasks.
FIG. 3B illustrates an example radio signal processing application that is defined by both digital signal processing tasks and machine learning models.
FIG. 3C illustrates an example radio signal processing application that is defined as a completely learned system.

For example, as illustrated in FIGS. 3A-C, a radio signal processing application may be a radio receiver that takes in samples, synchronizes, demodulates, decodes, and outputs packets or bits. The radio signal processing application 300a may be completely defined as digital signal processing tasks as shown by the example in FIG. 3A.

In this example, the radio receiver takes in samples 301 that are sent to different digital signal processing tasks such as a gain control algorithm 303. After the gain control algorithm, the input is synchronized using a synchronization algorithm 305, demodulated using a demodulation algorithm 307, decoded using an FEC decode algorithm 309. Then, the receiver outputs the decoded packets 313. This radio receiver processing application 300a can be defined using digital signal processing functionality that can be expressed using functional data tensor blocks 202 as illustrated in FIG. 2, with each functional data tensor block representing one step in the radio receiver application process.

A similar radio receiver processing application may alternatively be defined by both digital signal processing tasks and machine learning models as illustrated by the example in FIG. 3B. In this example implementation, the radio receiver processing application 300b includes a radio receiver taking samples in 301 and sending them to a gain control algorithm 303 and a synchronization algorithm 305. The radio receive processing application 300b then uses a machine learning-based mapping function to replace the digital signal processing tasks of demodulation and FEC decoding 311. Then, the receiver outputs the decoded packets 313. Both the traditional digital signal processing tasks and the machine learning model can be defined using functional data tensor blocks 202 and tensor expressions as illustrated in FIG. 2 so that the placement and scheduling of all portions may be jointly optimized across computing resources efficiently.

In some implementations, the radio receiver processing application may be defined as a completely learned system as illustrated by the example in FIG. 3C. In this example implementation, the radio receiver processing application 300c includes a radio receiver receiving samples in 301, a minimal pre-processing step 302 and then a machine learning-based mapping function that replaces the entire traditional digital signal processing chain for radio receiving with approximate solutions trained from sample data 312. In this example, the machine learning-based mapping function then outputs decoded packets 313. The entire application process can be defined using functional data tensor blocks 202 and tensor expressions as illustrated in FIG. 2.

Figure 4:
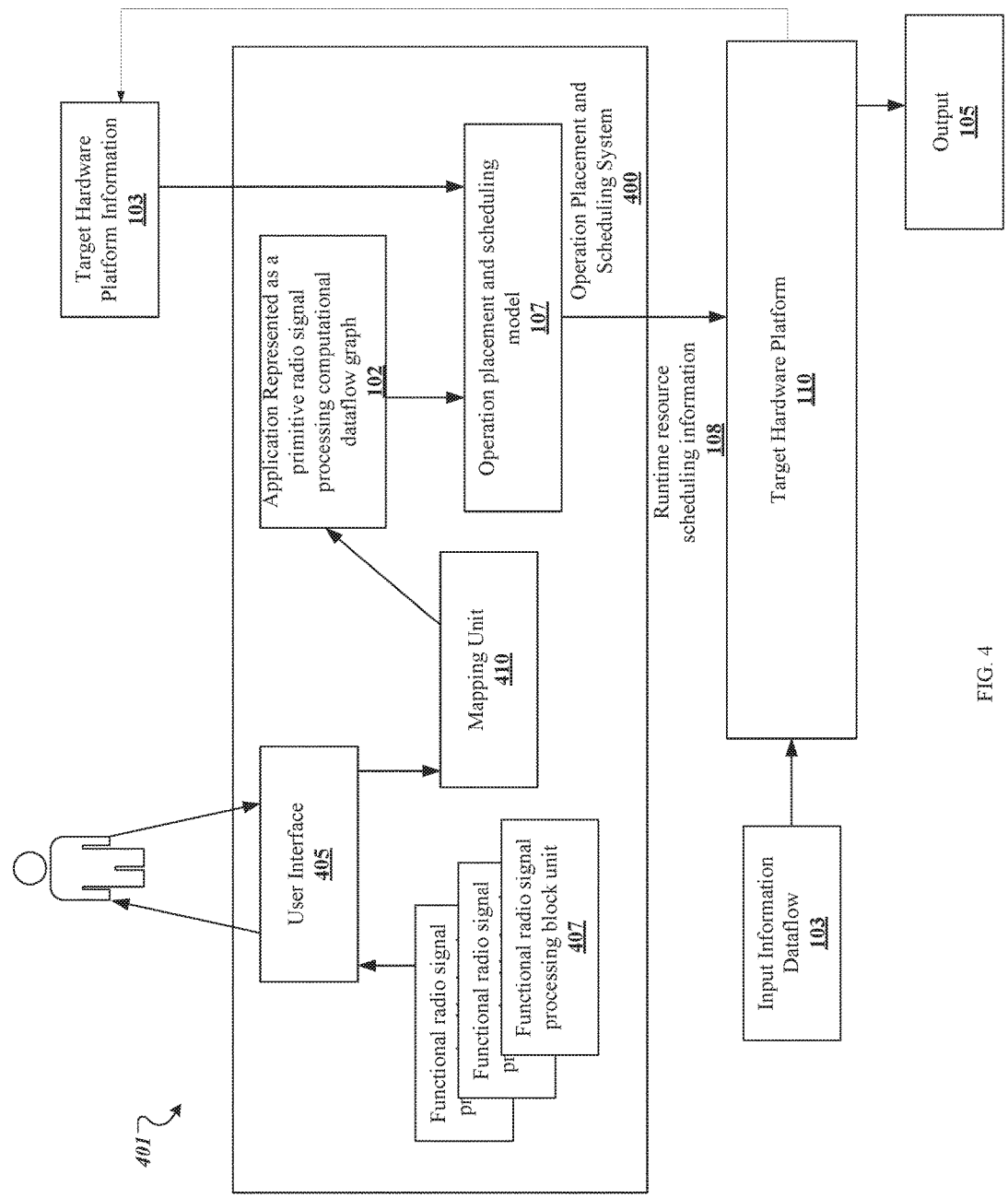
FIG. 4 illustrates an example operation placement and scheduling system that provides a user with the ability to build an application using functional data tensor blocks through a user interface.

In one implementation, a user may have the ability to build a radio signal processing application using functional data tensor blocks 202 through a user interface, for example, by being presented with boxes representing functional blocks and connecting the boxes with arrows representing the data flows to and from them. FIG. 4 illustrates an example operation placement and scheduling system 400 that provides the user with this capability. The system 400 provides a user interface 405 that presents the user with functional radio signal processing block units 407. The user, through the user interface 405, can connect the functional radio signal processing blocks 407 together to form a functional radio signal processing application, and can enter high-level parameters describing each block (e.g., channel index, preamble values, filter taps, or other specifications). These high-level parameters are mapped into the resulting application appropriately. Some example radio signal processing applications include: a radio receiver (e.g., ATSC, LTE, Wi-Fi, Bluetooth, Satellite, or other similar radio communications systems), a radar processor (e.g., pulse generation and integration, analysis, and state machine or optimization-driven dynamic control behavior), a radio transmitter or receiver, a radar or sensing application, a communications modem, or an application for processing a radio signal to remove interference or correct for distortion, or an application that processes radio frequency sample data in order to infer information underlying the data (e.g. corresponding objects, behaviors, potential threats, device failures or anomalies, etc.).

The system 400 receives the user's functional radio signal processing application through the user interface 405. The functional radio signal processing application may be in the form of a functional radio signal processing block dataflow graph as illustrated in FIG. 2.

The functional radio signal processing block dataflow graph is expressed in terms of symbolic tensor expressions which can be mapped into a flattened dataflow graph by a mapping unit 410 to produce a primitive radio signal processing computational dataflow graph. The mapping unit 410 flattens the functional radio signal processing block dataflow graph by combining primitive operations across multiple functional blocks to form a large graph of primitive operations. For example, the functional blocks may already be stored in their corresponding primitive graph form, or a procedural program may be converted to a primitive graph form through a process tracking the dataflow through the set of operations. The mapping unit 410 then joins the operations without regard to the barriers formed by the boundary edges of the functional radio signal processing blocks 407, and may replicate portions of the graph on different sets of processing data, for example to exploit data parallelism.

Figure 5:
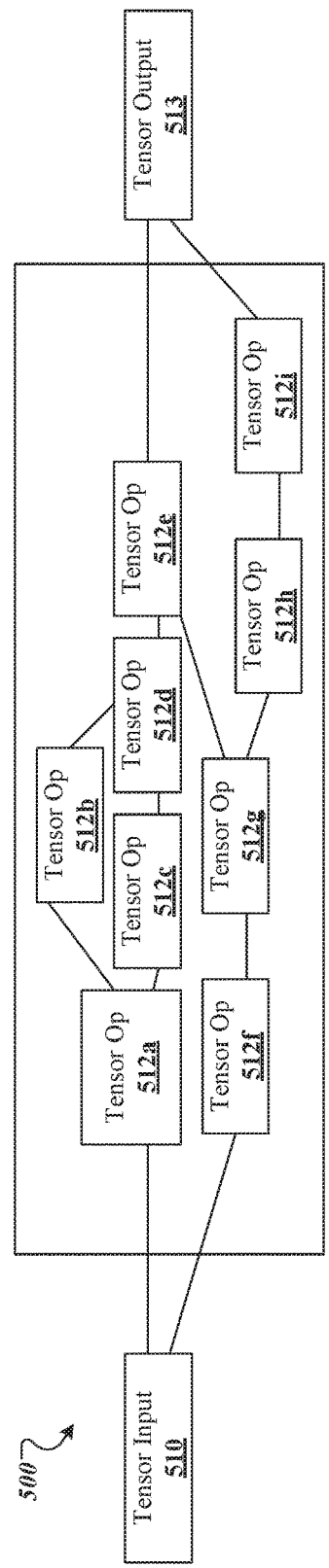
FIG. 5 illustrates an example of a primitive radio signal processing computational dataflow graph that results from flattening a functional radio signal processing block dataflow graph such as the dataflow graph illustrated in FIG. 2.

FIG. 5 illustrates an example of a primitive radio signal processing computational dataflow graph 500 that results from flattening a functional radio signal processing block dataflow graph, such as the dataflow graph illustrated in FIG. 2. In the dataflow graph 500, functional tensor blocks 202 are mapped to several tensor operations 512 without regard to the functional boundaries of the functional tensor blocks 202. For example a tuning operation defined by a digital oscillator and a mixer, followed by a filtering and decimation operation, may be merged into a single kernel by combining the primitive multiply, add and other tensor operations comprising each functional block, or the two may be split into more than two software kernels if it is deemed more efficient for the optimization objectives and target hardware platform. The graph takes in the same tensor input 510 as the original functional radio signal processing block dataflow graph and outputs the same or similar output 513.

Referring back to FIG. 4, once the system 400 flattens the functional radio signal processing block dataflow graph to a primitive radio signal processing computational dataflow graph, the operation placement and scheduling system 400 functions similarly to the operation placement and scheduling system 100 of FIG. 1.

Figure 6:
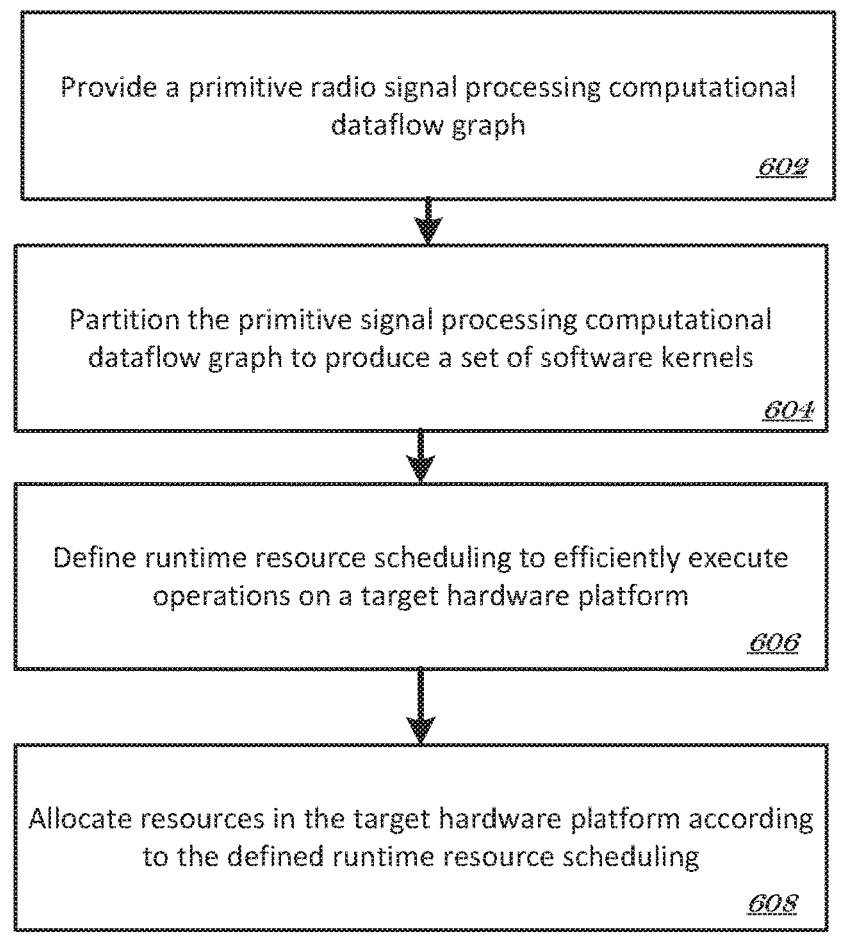
FIG. 6 illustrates a flow diagram of an example process for determining an optimal runtime resource scheduling for executing computational graph operations in a target hardware platform.

FIG. 6 illustrates a flow diagram of an example process 600 for determining an optimal runtime resource scheduling for executing computational graph operations in a target hardware platform. The process 600 is performed by a system of one or more computers, located in one or more locations, and programmed appropriately in accordance with this specification. For example, an operation placement and scheduling system, e.g., the operation placement and scheduling system 100 of FIG. 1 or the operation placement and scheduling system 400 of FIG. 4, appropriately programmed can perform process 600.

As illustrated in FIG. 6, to determine an optimal runtime resource scheduling for executing computational graph operations in a target hardware platform, the system provides a primitive radio signal processing computational data graph that includes the computational graph operations 602. In some implementations, as described above, a user expresses a radio signal processing application using a high-level functional tensor block graph. The system flattens the high-level graph to a low-level primitive graph in order to optimize graph operation execution. The system then partitions the primitive signal processing computational dataflow graph to produce a set of software kernels. The system makes an initial prediction regarding how to partition the software kernels. The system subdivides both operations in the graph and their edges in order to achieve operation parallelism. In some instances, the system may also replicate portions of the graph on multiple processors to operate on different sets of data also to achieve additional parallelism, for example, when the throughput of the corresponding subgraph regions is lower than the surrounding regions. The system also determines the amount of data that should traverse each edge to provide data parallelism and more efficient execution.

Figure 7:
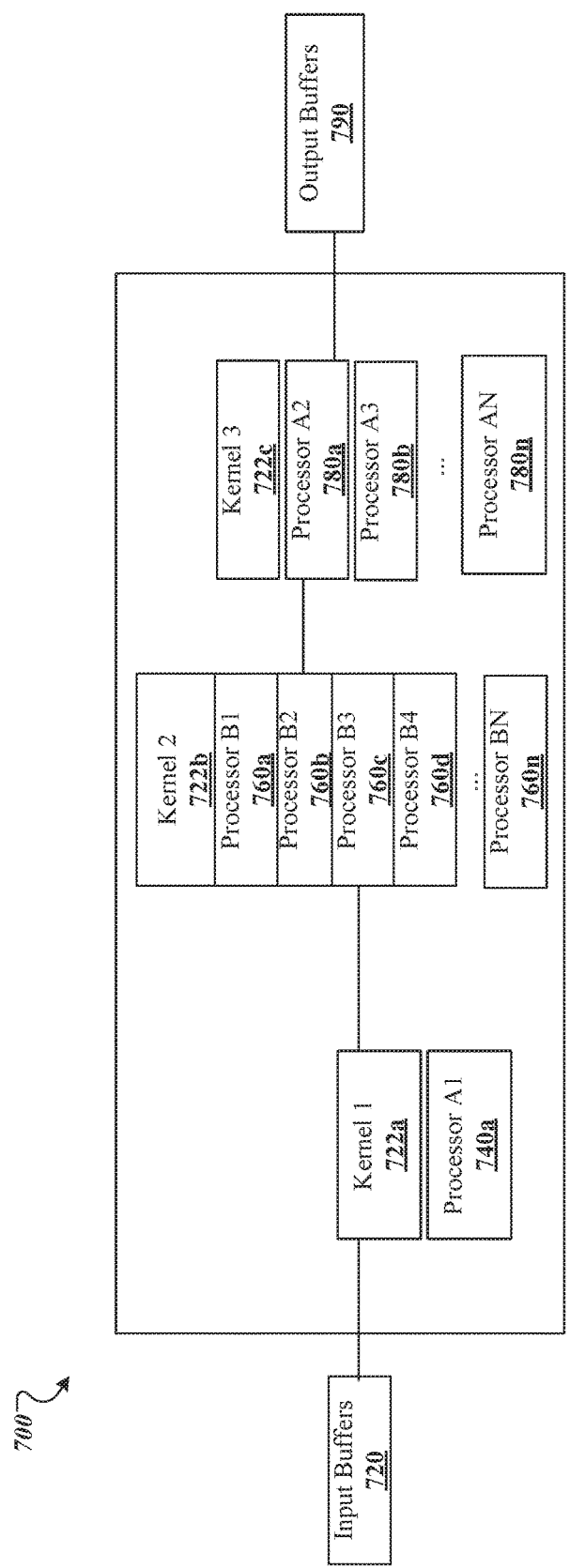
FIG. 7 illustrates an example distribution of software kernels across multiple processing units of a target hardware platform.

FIG. 7 illustrates an example distribution of software kernels across multiple processing units of a target hardware platform. In this example, the system assigns one core of Processor A, e.g., processor A1 740a, to execute Kernel 1 722a. Processor B may have multiple cores 760a-760n that process software kernel Kernel 2 722b, while additional cores of processor A (e.g., processor cores 780a-780n) process software kernel Kernel 3 722c.

Referring back to the process of FIG. 6, the system may iteratively partition the primitive signal processing computational dataflow graph to determine the optimal set of software kernels and mappings to execute on the target hardware platform that achieve at least one identified optimization objective 604.

In order to determine optimal partitioning, the system may measure the resource use of the processing units in the target hardware platform when the initial set of software kernels are executed. The measured resource use can be from actual execution, predicted execution, or simulated execution. In the case of actual execution, information from the target hardware platform and from the execution of the graph and its measured detailed performance metrics can be fed back to the operation placement and scheduling model in order for the model to evaluate the efficiency of the software kernel execution. The system may then iteratively change the partitioning to produce an updated set of software kernels that better achieves at least one optimization objective than the initial set of software kernels, given the measured resource use. In some implementations, the system uses scheduling measurement information to improve the partitioning. Additionally or alternatively, the system may use mapping to different processors and/or architecture to improve the partitioning.

This iterative execution can improve performance, for example because exact performance of large many-processor software systems can be difficult to determine exactly, especially under dynamic load that depends on the properties, quality and content of the incoming information stream (e.g., high vs low signal to noise ratio, idle or fully loaded communications signals, varying sample rates, varying channel impairment complexity, among others).

For example, the system may predict an initial set of software kernels that minimizes an aggregate resource use of processing units in a target hardware platform. The system may then measure the predicted, simulated, or actual resource use of the processing units running the initial set of software kernels. The system may then change the partitioning of the software kernels to produce an updated set of software kernels that better achieves optimization objectives.

In some implementations, in order to identify an initial set of software kernels or an updated set of software kernels, the system uses predictions and statistical models that include models for the computational, memory, and communications costs of hardware. Additionally, or alternatively, the system can use one or more machine learning models.

A machine learning model may be a neural network, a Bayesian inference model, or another form of model such as a stochastic regression or classification technique (e.g. an autoregressive and moving average (ARMA) model, support vector machine (SVM), etc.). Neural networks are machine learning models that employ one or more layers of neurons to generate an output, e.g., one or more classifications or regressions, for its input. Neural networks may include one or more hidden layers in addition to an output layer. The output of each hidden layer can be used as input to the next layer of in the network, i.e., the next hidden layer or the output layer, and connections can also bypass layers, or return within the same layer such as is the case in a recurrent network unit. Each layer of the neural network generates an output from its inputs in accordance with the network architecture and a respective set of parameters for the layer.

The machine learning models may be trained on simulated data or on actual target hardware on which the computational graph representing the radio signal processing application will be deployed, or they may be tuned while in operation based on a goodness metric for their output, which may be used as feedback to adjust weights or parameters.

In addition to determining software kernel partitioning, the system defines runtime resource scheduling to efficiently execute operations on a target hardware platform 606. Defining runtime resource scheduling includes determining data placement for individual software kernels across processing units of the target hardware platform. In addition to determining placement for the software kernels, the system may also determine buffer sizes between kernels, determine the amount of data on which each software kernel should execute at a given time, determine an order in which the software kernels should execute, or an amount of information that should be transferred over a bus or memory region each time between kernel executions or moves between processor domains. The runtime scheduling can also determine how large memory writes for inter-thread communications will be, how long processing time between inter-thread communications will take, and how well caches will perform.

This runtime resource scheduling can be determined using models that are same or similar to the ones used to determine kernel placement. The models may be prediction and statistical models or machine learning models that predict optimal scheduling and resource allocation and use. Additionally or alternatively, the models be based on measurement of performance based on prior execution information. These models in general may predict the performance of different placement and execution scheduling configurations, enabling selection, from among a plurality of candidates, of a best estimate for the optimal configuration. Upon iteration, the accuracy of these estimates may be refined through increasing confidence in estimation and measurement.

Figure 8A:
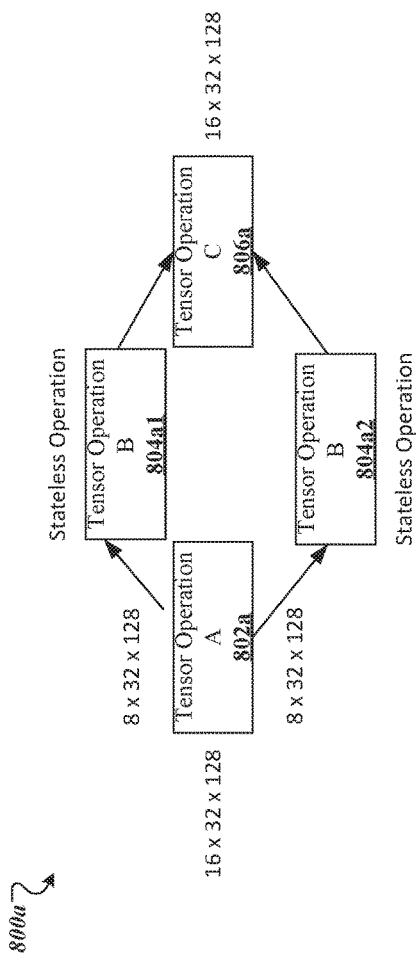
FIG. 8A illustrate an example of a runtime scheduling of operations that shows how operations can be parallelized over data in a tensor dimension.
Figure 8B:
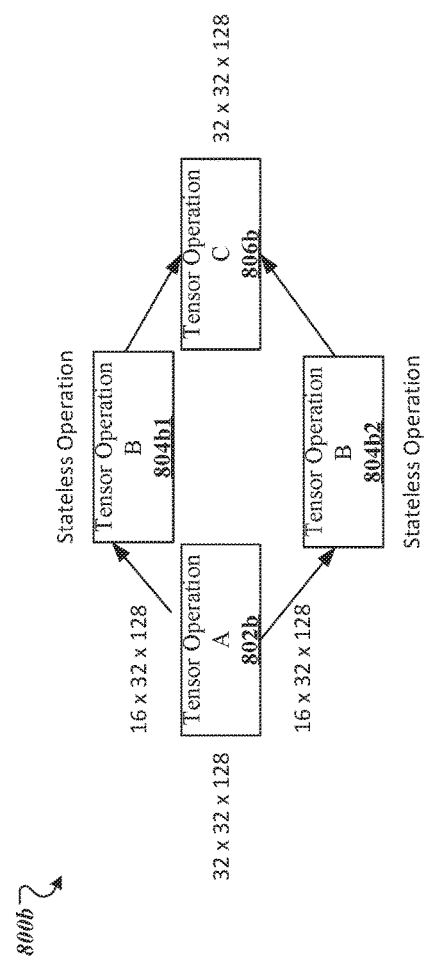
FIG. 8B illustrates an example of a runtime scheduling of operations that shows how the parallelized operations of FIG. 8A can be executed with twice the work sizes. Although

FIGS. 8A and B illustrate examples of runtime scheduling of operations that show how operations can be parallelized over data in a tensor dimension. Operation can be parallelized over data in a tensor dimension as long as the operations have no internal state, as shown in FIGS. 8A and 8B by operation 804a1 and 804a2. The example runtime scheduling 800a of FIG. 8A shows that the first input information includes 16 items in a first tensor dimension. The operation placement and scheduling system can predict or simulate execution of Operation A 802a using the 16 elements in this first dimension. Operation B 804a can be parallelized over data in this first dimension to that half of the elements go to one instantiation of Operation B 804a1 and the other half of the elements are sent to a second instantiation of Operation B 804a2. The outputs from the parallelized executions of Operation B are sent to Operation C 806a where operation c is run on all 16 elements of the first tensor dimension and the resulting tensor is output.

FIG. 8B shows the operations of FIG. 8A with twice the work size. Instead of the operations executing on 16 elements at a time, the operations execute on 32 elements. The example runtime scheduling 800b of FIG. 8B shows that the first input information includes 32 items in a first tensor dimension. The operation placement and scheduling system can predict or simulate execution of Operation A 802b using the 32 elements in this first dimension. Operation B 804b can be parallelized over data in this first dimension to that half of the elements go to one instantiation of Operation B 804b1 and the other half of the elements are sent to a second instantiation of Operation B 804b2. The outputs from the parallelized executions of Operation B are sent to Operation C 806b where operation C is run on all 32 elements of the first tensor dimension and the resulting tensor is output.

The system, using machine learning or predictive and statistical models or a combination of both, determines whether the resource use of runtime schedule 800*b* of FIG. 8B which requires longer kernel runs and larger I/O sizes results in more efficient performance at runtime than the runtime schedule 800*a* of FIG. 8A that performs half the work per execution. The system then chooses the most efficient runtime resource scheduling to send to the target hardware platform.

In order to define efficient runtime scheduling, the system may also take into consideration other processes that are running on the target hardware platform or will be concurrently executed by the target system. In one implementation, the other process may be a second application that is also represented as a primitive radio signal processing computational dataflow graph. In this case, the system may identify specific runtime scheduling for both computational dataflow graphs that achieve specified optimization objectives when both computational dataflow graphs are executing in the target system. In other instances, software that is not derived explicitly from a similar data flow graph may be executing on a core shared with the computational dataflow graph, or separately on a core that is excluded from the dataflow graph placement algorithm.

In another implementation, the system may only be aware of the other process or processes that are running on the target system and the resources that are being used. For example, the target system may be executing a high priority system task that cannot be disrupted. The operation placement and scheduling system may factor in the resource availability and usage when determining the runtime resource scheduling and placement for the computational graph.

In some implementations, defining runtime scheduling includes determining an optimal processing unit type on which to execute operations from a software kernel and assigning the software kernel to at least one processing unit of the optimal processing type. For example, when assigning computational graphs across a CPU, GPU, DSP, tensor or vector math operation co-processor, other neuromorphic processor and/or FPGA, the graph may be partitioned with initial high rate operations on the FPGA, additional lower complexity operations on the CPU, and higher complexity operations on the GPU. In some cases where an FPGA is not available, high throughput and high complexity operations may be scheduled on the GPU, while external interfaces or transforms, or lower complexity operations, may be placed on the CPU. In some instances, where only a CPU is available, all units may be scheduled thereon. This placement optimization is done using the predicted performance metrics for candidate placement and execution candidates as previously described, taking into account the resources available on each computational platform.

Referring back to FIG. 6, after defining runtime resource scheduling to efficiently execute operations on a target hardware platform, the process 600 allocates resources in the target hardware platform according to the defined runtime resource scheduling 608.

FIGS. 9A and 9B illustrate example systems in which resources and kernel placements are defined by runtime resource scheduling in order to efficiently execute operations on the target platform to achieve optimized execution. FIG. 9A illustrates an example tensor dataflow-based radio receiver system 900*a* and FIG. 9B illustrates an example tensor dataflow-based radio transmitter system 900*b*. Both of these systems can be created using the process 600 described above.

In some implementations, the system can determine the runtime resource scheduling information for a specific target hardware implementation using only simulated or predicted data and a specific computational graph. The system can determine a fixed configuration for the graph along with other runtime scheduling information and provide the fixed configuration to a specific locked down hardware configuration, e.g., a mobile phone baseband processor or DSP, for execution.

In other implementations, the system needs to execute on the target hardware platform in order to determine the correct configuration for the graph along with other runtime scheduling information. For example, the system may need to run at different input sample rates or use different modulations in order to correctly determine a configuration for a computational graph for the target hardware platform.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method comprising:
    providing functional radio signal processing tensor blocks to build a functional radio signal processing application, the functional radio signal processing tensor blocks representing symbolic radio tensor expressions and directed edges that represent data flow;
    obtaining a functional radio signal processing block dataflow graph comprising functional tensor blocks that represent a specific functional radio signal processing application;

mapping the functional radio signal processing block dataflow graph to a specific primitive radio signal processing computational dataflow graph that corresponds to functionality of the specific functional radio signal processing application;

providing the specific primitive radio signal processing computational data flow graph as a primitive radio signal processing computational dataflow graph that comprises nodes representing operations and directed edges representing data flow, the primitive radio signal processing computational dataflow graph represents a functional radio signal processing application;

partitioning the nodes and directed edges of the primitive radio signal processing computational dataflow graph to produce a set of software kernels that, when executed on a plurality of processing units of a target hardware platform, achieve a specific optimization objective;

defining runtime resource scheduling including data placement for individual software kernels in the set of software kernels to efficiently execute operations on the plurality of processing units of the target hardware platform; and allocating the resources of the plurality of processing units in the target hardware platform according to the defined runtime resource scheduling.

2. The method of claim 1, wherein defining resource runtime scheduling further includes determining buffer sizes between software kernels, determining an amount of data on which each software kernel executes at a given time, determining an order in which the software kernels execute, or determining an amount of information transferred over a bus or memory region at each time between kernel executions or moves between processor domains.

3. The method of claim 1, further comprising:
executing the individual software kernels on the processing units of the target hardware platform in accordance with the defined resource runtime scheduling.

4. The method of claim 3, wherein operations are pipelined across the plurality of processing units of the target hardware platform.

5. The method of claim 3, wherein operations are executed in parallel.

6. The method of claim 1, wherein the functional radio signal tensor blocks represent commonly used radio signal processing operations that act on input tensor data and produce output tensor data flow.

7. The method of claim 6, wherein commonly used radio signal processing operations include one or more of a finite impulse response filter, a fast Fourier transform, an infinite impulse response filter, a digital oscillator and mixer, an automatic gain control function, a synchronization algorithm, a symbol modulator or demodulator, an error correction encoder or decoder, GNU radio functional operations, or Matlab functional operations.

8. The method of claim 1, wherein partitioning the nodes and directed edges of the primitive radio signal processing computational dataflow graph to produce a set of software kernels comprises:
predicting an initial set of software kernels that minimizes an aggregate resource use of the processing units;
measuring resource use of the processing units having the initial set of software kernels; and
changing the partitioning to produce an updated set of software kernels that achieves an optimization objective based on the measured resource use.

9. The method of claim 8, wherein measuring resource use of the processing units having the initial set of software kernels comprises:
measuring actual resource use of the processing units when the processing units execute the initial set of software kernels.

10. The method of claim 8, wherein measuring resource use of the processing units having the initial set of software kernels comprises:
measuring actual resource use while data flowing into the primitive radio signal processing computational dataflow graph changes.

11. The method of claim 10, wherein the data flowing into the primitive radio signal processing computational dataflow graph includes: radio frequency data, signals, signal loadings, or content types.

12. The method of claim 1, wherein achieving an optimization objective based on the measured resource use includes:
identifying the optimization objective as minimizing an aggregate resource use;
predicting processing capacity of each processing unit of the target platform;
predicting memory access time of each processing unit;
predicting communication time among the processing units; and
iteratively partitioning the nodes and directed edges of the primitive radio signal processing computational dataflow graph to produce a set of software kernels that minimize the aggregate resource use based on the predicted processing capacity, predicted memory access time, and predicted communication time.

13. The method of claim 1, wherein the optimization objective is one or more of: maximizing processing unit usage across all available processing units; minimizing latency of graph processing through processing units; obtaining maximum throughput; minimizing power consumption; minimizing interference with other running software processes; and minimizing processor, logic gate, or memory requirements to execute at a fixed rate or latency.

14. The method of claim 1, further comprising:
obtaining a second primitive radio signal processing computational dataflow graph comprising nodes representing operations and directed edges representing dependencies; and
identifying the specific optimization objective as minimizing an aggregate resource use of the processing units when executing both the first primitive radio signal processing computational dataflow graph and the second primitive radio signal processing computational dataflow graph.

15. The method of claim 1, wherein the plurality of processing units of the target hardware platform includes processing units of multiple types.

16. The method of claim 15, wherein defining data placement for the individual software kernels to efficiently distribute operations across the plurality of processing units of the target hardware platform includes:
determining an optimal processing unit type on which to execute at least one software kernel from the multiple types of processing units in the target hardware platform; and
defining a data placement of the at least one software kernel in the set of software kernels to a processing unit in the target hardware platform of the determined optimal processing unit type.

17. The method of claim 1, wherein the functional radio signal processing application includes implementing a communications modem; performing a cellular baseband processing task; performing radio sensing, labeling, analysis, or mapping; processing a radio signal to remove interference or correct for distortion; or sending or receiving radar pulses.

18. The method of claim 17, wherein performing a cellular baseband processing task includes transceiving an LTE, a 5G, or a 6G waveform.

19. The method of claim 17, wherein performing radio sensing includes sensing for radio signals for identifying threats, anomalies, hardware failures, interferences, or mappings.

20. The method of claim 1, wherein the functional radio signal processing application includes processing a radio frequency signal to generate a radio frequency signal with interference or distortion removed.

21. The method of claim 1, wherein the functional radio signal processing application includes processing radar signals to generate pulses as tensors and to receive pulse responses and estimate properties of reflecting items.

22. The method of claim 1, wherein the target hardware platform includes a large-scale datacenter with a plurality of modems receiving data from a plurality of input streams from antennas and analog to digital converters and a plurality of computing devices.

23. The method of claim 1, wherein the target hardware platform includes at least one of: a single processor, multiple processors of a same type, a shared memory architecture with multiple types of co-processors, a distributed memory architecture, or a network of multi-processors or multi-multi-processors that each have separate memory architectures.

24. The method of claim 6, wherein the tensor data includes radio signals such as digitally sampled In-Phase and Quadrature time series numbers, digitally sampled acoustic time series information, power frequency spectrum information such as spectrograms, radar data-cube processing information such as pulse integration, output of other software that might produce vectors of bits, packets, messages, samples, or values.

25. The method of claim 1, wherein obtaining a functional radio signal processing block dataflow graph comprising functional tensor blocks that represent a specific functional radio signal processing application comprises:
providing a user interface that allows a user to select functional signal processing blocks and connect the functional signal processing blocks together to form a functional radio signal processing application; and
receiving the functional radio signal processing application in the form of a functional radio signal processing block dataflow graph from the user interface.

26. The method of claim 1, wherein partitioning comprises iteratively partitioning.

27. The method of claim 1, wherein the functional radio signal tensor blocks represent a combination of one or more radio signal processing operations and machine learning operations that act on input tensor data and produce output tensor data flow.

28. A method comprising:
providing a primitive radio signal processing computational dataflow graph that comprises nodes representing operations and directed edges representing data flow, the primitive radio signal processing computational dataflow graph represents a functional radio signal processing application;
partitioning the nodes and directed edges of the primitive radio signal processing computational dataflow graph to produce a set of software kernels that, when executed on a plurality of processing units of multiple types in a target hardware platform, achieve a specific optimization objective;
defining runtime resource scheduling including data placement for individual software kernels in the set of software kernels to efficiently execute operations on the plurality of processing units of the target hardware platform by:
determining an optimal processing unit type on which to execute at least one software kernel from multiple types of processing units in the target hardware platform; and
defining a data placement of the at least one software kernel in the set of software kernels to a processing unit in the target hardware platform of the determined optimal processing unit type, and
allocating the resources of the plurality of processing units of multiple types in the target hardware platform according to the defined runtime resource scheduling.

29. A system comprising:
one or more processors; and
one or more storage devices storing instructions that are operable, when executed on the one or more processors, to cause the one or more processors to:
provide functional radio signal processing tensor blocks to build a functional radio signal processing application, the functional radio signal processing tensor blocks representing symbolic radio tensor expressions and directed edges that represent data flow;
obtain a functional radio signal processing block dataflow graph comprising functional tensor blocks that represent a specific functional radio signal processing application;
map the functional radio signal processing block dataflow graph to a specific primitive radio signal processing computational dataflow graph that corresponds to functionality of the specific functional radio signal processing application;
provide the specific primitive radio signal processing computational data flow graph as a primitive radio signal processing computational dataflow graph that comprises nodes representing operations and directed edges representing data flow, the primitive radio signal processing computational dataflow graph represents a functional radio signal processing application;
partition the nodes and directed edges of the primitive radio signal processing computational dataflow graph to produce a set of software kernels that, when executed on a plurality of processing units of a target hardware platform, achieve a specific optimization objective;
define runtime resource scheduling including data placement for individual software kernels in the set of software kernels to efficiently execute operations on the plurality of processing units of the target hardware platform; and
allocate the resources of the plurality of processing units in the target hardware platform according to the defined runtime resource scheduling.

* * * * *

UNITED STATES PATENT AND TRADEMARK OFFICE
CERTIFICATE OF CORRECTION

PATENT NO. : 10,200,875 B2
APPLICATION NO. : 15/955433
DATED : February 5, 2019
INVENTOR(S) : Timothy James O'Shea It is certified that error appears in the above-identified patent and that said Letters Patent is hereby corrected as shown below:

In the Claims

In Claim 28, Column 22, Line 20 (Approx.), delete "type," and insert -- type; --, therefor.

Signed and Sealed this
Ninth Day of April, 2019

Andrei Iancu
*Director of the United States Patent and Trademark Office*